(12) United States Patent
Tsushima et al.

(10) Patent No.: US 11,220,272 B2
(45) Date of Patent: Jan. 11, 2022

(54) FAILURE DETECTION APPARATUS, FAILURE DETECTION METHOD, AND COMPUTER READABLE MEDIUM

(71) Applicant: Mitsubishi Electric Corporation, Tokyo (JP)

(72) Inventors: Naoyuki Tsushima, Tokyo (JP); Masahiko Tanimoto, Tokyo (JP); Masahiro Abukawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 135 days.

(21) Appl. No.: 16/644,674

(22) PCT Filed: Nov. 13, 2017

(86) PCT No.: PCT/JP2017/040741
§ 371 (c)(1),
(2) Date: Mar. 5, 2020

(87) PCT Pub. No.: WO2019/092880
PCT Pub. Date: May 16, 2019

(65) Prior Publication Data
US 2020/0283006 A1    Sep. 10, 2020

(51) Int. Cl.
*B60W 50/02* (2012.01)
*G06K 9/00* (2006.01)

(52) U.S. Cl.
CPC ..... *B60W 50/0205* (2013.01); *G06K 9/00791* (2013.01); *B60W 2050/021* (2013.01); *B60W 2050/0215* (2013.01); *B60W 2420/52* (2013.01)

(58) Field of Classification Search
CPC .............................................. B60W 50/0205
See application file for complete search history.

(56) References Cited

U.S. PATENT DOCUMENTS

2009/0265104 A1* 10/2009 Shroff .................. G01C 21/165
701/472
2019/0285726 A1*  9/2019 Muto ...................... G01S 13/87

FOREIGN PATENT DOCUMENTS

| JP | 2007-178310 A  |   | 7/2007 |
| JP | 2007178310 A   | * | 7/2007 |
| JP | 2008-60874 A   |   | 3/2008 |
| JP | 4079739 B2     | * | 4/2008 |
| JP | 2009-146086 A  |   | 7/2009 |
| JP | 5018444 B2     |   | 9/2012 |

(Continued)

OTHER PUBLICATIONS

International Search Report, issued in PCT/JP2017/040741, PCT/ISA/210, dated Feb. 6, 2018.

*Primary Examiner* — Shelley Chen
(74) *Attorney, Agent, or Firm* — Birch, Stewart, Kolasch & Birch, LLP (57) ABSTRACT

A detected data acquisition unit (21) acquires detected data outputted during a past reference period by a sensor (31) mounted on a moving body (100). A peripheral data acquisition unit (22) acquires peripheral data detected by a peripheral body existing on peripheral of the moving body (100). A failure determination unit (23) determines whether or not there is a failure in the sensor (31) based on whether or not the detected data includes detected data that identifies a detected content of which difference from a peripheral content identified from the peripheral data is within a reference scope.

6 Claims, 12 Drawing Sheets

(56) References Cited

FOREIGN PATENT DOCUMENTS

| JP | 2016-162204 A | | 9/2016 |
|---|---|---|---|
| JP | 2016162204 A | * | 9/2016 |
| JP | 2016-197081 A | | 11/2016 |
| JP | 2016197081 A | * | 11/2016 |

* cited by examiner

FAILURE DETECTION APPARATUS, FAILURE DETECTION METHOD, AND COMPUTER READABLE MEDIUM

TECHNICAL FIELD

The present invention relates to a technology for detecting a failure in a sensor mounted on a moving body.

BACKGROUND ART

Rise in safety awareness and pursuit of convenience have led to an increase in automobiles equipped with a driving support function, such as an emergency automatic braking function. In order to realize the driving support function, there is a case where a sensor that emits radio waves or lights, such as a millimeter wave radar or Light Detection and Ranging (LiDAR), is employed.

If a sensor for realizing a driving support function is in complete failure, the driving support function cannot be used. However, if an anomaly occurs only in a part of a sensing range of the sensor, as in a case where dirt or dust adheres to the sensor, there is a possibility that a detection result indicating that there is no obstacle will be obtained, although there is actually an obstacle. If such a detection result is obtained, there is a possibility that the driving support function will malfunction.

Patent Literature 1 describes detection of an anomaly of a sensor by comparing a model of a normal sensing result generated based on previous driving data with an actual sensing result.

CITATION LIST

Patent Literature

Patent Literature 1: JP 2009-146086 A

SUMMARY OF INVENTION

Technical Problem

Even with the technology described in Patent Literature 1, an anomaly of a sensor cannot be detected, except in a situation similar to a model generated in advance.

It is an objective of the present invention to make it possible to detect the anomaly of the sensor without generating the model in advance.

Solution to Problem

A failure detection apparatus according to the present invention includes:

a detected data acquisition unit to acquire detected data that is sensor data outputted during a past reference period by a sensor mounted on a moving body;

a peripheral data acquisition unit to acquire peripheral data detected by a peripheral body existing on peripheral of the moving body; and a failure determination unit to determine whether or not there is a failure in the sensor based on whether or not the detected data acquired by the detected data acquisition unit includes detected data that identifies a detected content of which difference from a peripheral content is within a reference scope, the peripheral content being identified from the peripheral data acquired by the peripheral data acquisition unit.

Advantageous Effects of Invention

The present invention determines whether or not there is a failure in a sensor, based on whether or not detected data for a past reference period includes detected data that identifies a detected content of which difference from a peripheral content identified from peripheral data detected by a peripheral body is within a reference scope. In this way, it is possible to detect an anomaly of the sensor without generating a model in advance.

DESCRIPTION OF EMBODIMENTS

Embodiment 1

*Description of Configuration*

A configuration of a failure detection apparatus 10 according to Embodiment 1 will be described with reference to FIG. 1.

Figure 1:
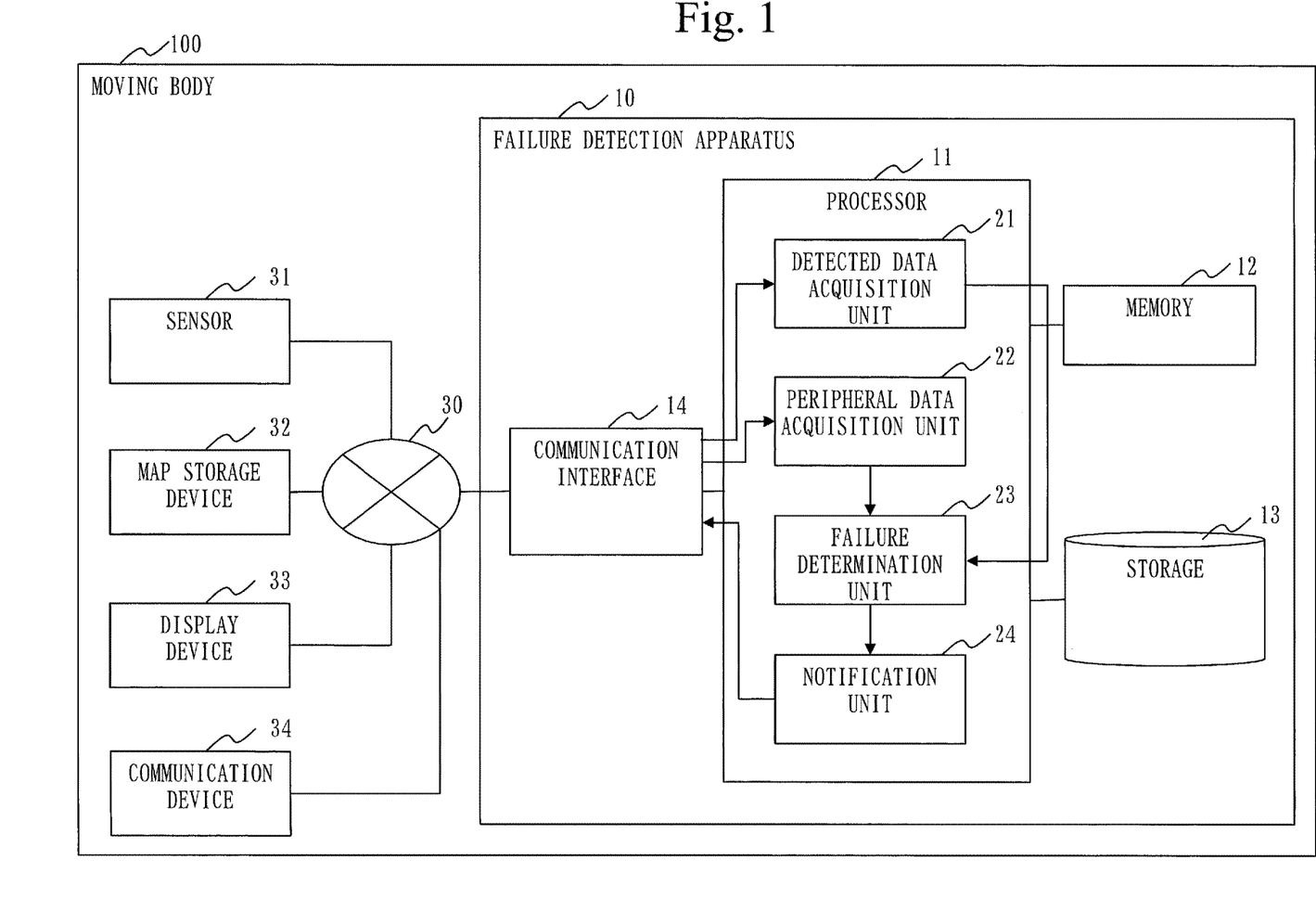
FIG. 1 is a configuration diagram of a failure detection apparatus 10 according to Embodiment 1.

FIG. 1 illustrates a state in which the failure detection apparatus 10 is mounted on a moving body 100. The moving body 100 is a vehicle, a ship, a train, or the like. In Embodiment 1, the description will be given assuming that the moving body 100 is a vehicle.

Note that the failure detection apparatus 10 may be implemented in a form that is integrated with or inseparable from the moving body 100 or any of other components illustrated therein. The failure detection apparatus 10 may be implemented also in a form that is detachable or separable.

The failure detection apparatus 10 is a computer.

The failure detection apparatus 10 has hardware of a processor 11, a memory 12, a storage 13, and a communication interface 14. The processor 11 is connected with other hardware via a signal line, and controls these other hardware.

The processor 11 is an integrated circuit (IC) that performs arithmetic processing. The processor 11 is composed of a register that stores instruction and information, a peripheral circuit, and the like. As a specific example, the processor 11 is a central processing unit (CPU), a digital signal processor (DSP), or a graphics processing unit (GPU).

The memory 12 is a storage device that temporarily stores data. As a specific example, the memory 12 is a static random-access memory (SRAM), or a dynamic random-access memory (DRAM).

The storage 13 is a storage device that stores data. As a specific example, the storage 13 is a ROM, a flash memory, or a hard disk drive (HDD). The storage 13 may also be a portable storage medium, such as a Secure Digital (SD, registered trademark) memory card, CompactFlash (CF), NAND flash, a flexible disc, an optical disc, a compact disc, a Blu-ray (registered trademark) disc, or a digital versatile disc (DVD).

The communication interface 14 is an interface for communicating with an external device. In Embodiment 1, the communication interface 14 is an interface for communicating via a network 30, such as a controller area network (CAN) or in-vehicle Ethernet (registered trademark) installed in the moving body 100. As a specific example, the communication interface 14 is a port of the controller area network (CAN), Ethernet (registered trademark), RS232C, or Universal Serial Bus (USB).

In Embodiment 1, the communication interface 14 is connected with a sensor 31, a map storage device 32, a display device 33, and a communication device 34, via the network 30.

The sensor 31 is a device, such as a millimeter wave radar or LiDAR, that emits a radio wave, light, sound, or the like, detects its reflection by an object, and thereby identifies a position and a velocity of the object.

The map storage device 32 is a storage device, such as a ROM, a flash memory, or an HDD that stores map data. The map data indicates a road boundary and the like.

The display device 33 is a device, such as a liquid crystal display (LCD), that displays information. The display device 33 is installed in the moving body 100 so as to be visible to a person on the moving body 100, such as a driver.

The communication device 34 is a device that communicates with a peripheral body 200 existing on peripheral of the moving body 100. The peripheral body 200 is a vehicle, a ship, or the like traveling on the peripheral of the moving body 100. Or, the peripheral body 200 is a roadside system or the like existing on the peripheral of the moving body 100.

The failure detection apparatus 10 has, as functional components, a detected data acquisition unit 21, a peripheral data acquisition unit 22, a failure determination unit 23, and a notification unit 24. Functions of the functional components of the failure detection apparatus 10 are realized by software.

The storage 13 stores a program that realizes the functions of the functional components of the failure detection apparatus 10. This program is loaded into the memory 12 by the processor 11, and executed by the processor 11. In this way, the functions of the functional components of the failure detection apparatus 10 are realized.

In FIG. 1, only one processor 11 is illustrated. However, the failure detection apparatus 10 may have a plurality of processors as alternatives to the processor 11. The plurality of processors share a task to execute the program that realizes the functions of the functional components of the failure detection apparatus 10.

*Description of Operation*

Operation of the failure detection apparatus 10 according to Embodiment 1 will be described with reference to FIGS. 2 to 10.

The operation of the failure detection apparatus 10 according to Embodiment 1 corresponds to a failure detection method according to Embodiment 1. And, the operation of the failure detection apparatus 10 according to Embodiment 1 corresponds to a failure detection program according to Embodiment 1.

Figure 2:
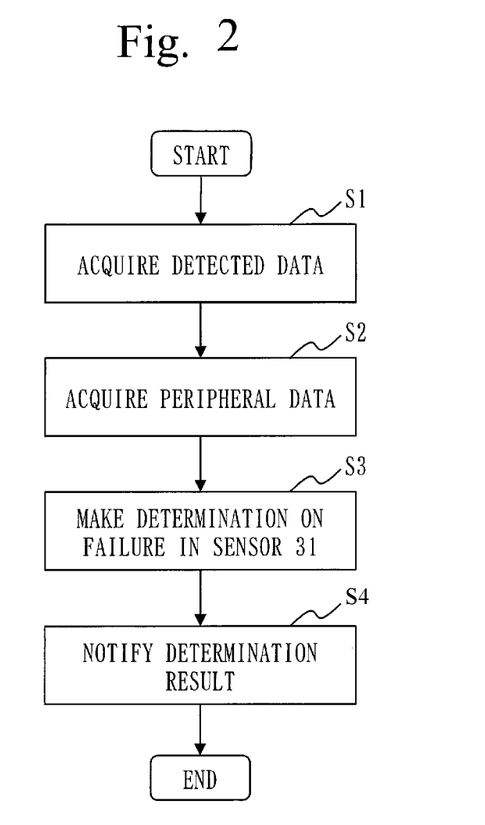
FIG. 2 is a flowchart illustrating operation of the failure detection apparatus 10 according to Embodiment 1.

(Step S1 of FIG. 2: Detected Data Acquisition Process)

The detected data acquisition unit 21 acquires detected data that is sensor data outputted during a past reference period by the sensor 31 mounted on the moving body 100, via the communication interface 14. The detected data is data from which a relative position, a relative movement direction, and a relative movement velocity of a detected object to the moving body 100 are identifiable as a detected content.

The detected data acquisition unit 21 identifies, based on the detected data, for each detected object, the relative position, the relative movement direction, and the relative movement velocity. The detected data acquisition unit 21 converts the relative position of the each detected object into a position on an absolute coordinate system. In specific, the detected data acquisition unit 21 receives a positioning signal from a satellite, thereby identifies a position of the moving body 100 on the absolute coordinate system, and then converts, on a basis of the position identified, the relative position of the each detected object into the position on the absolute coordinate system.

Figure 4:
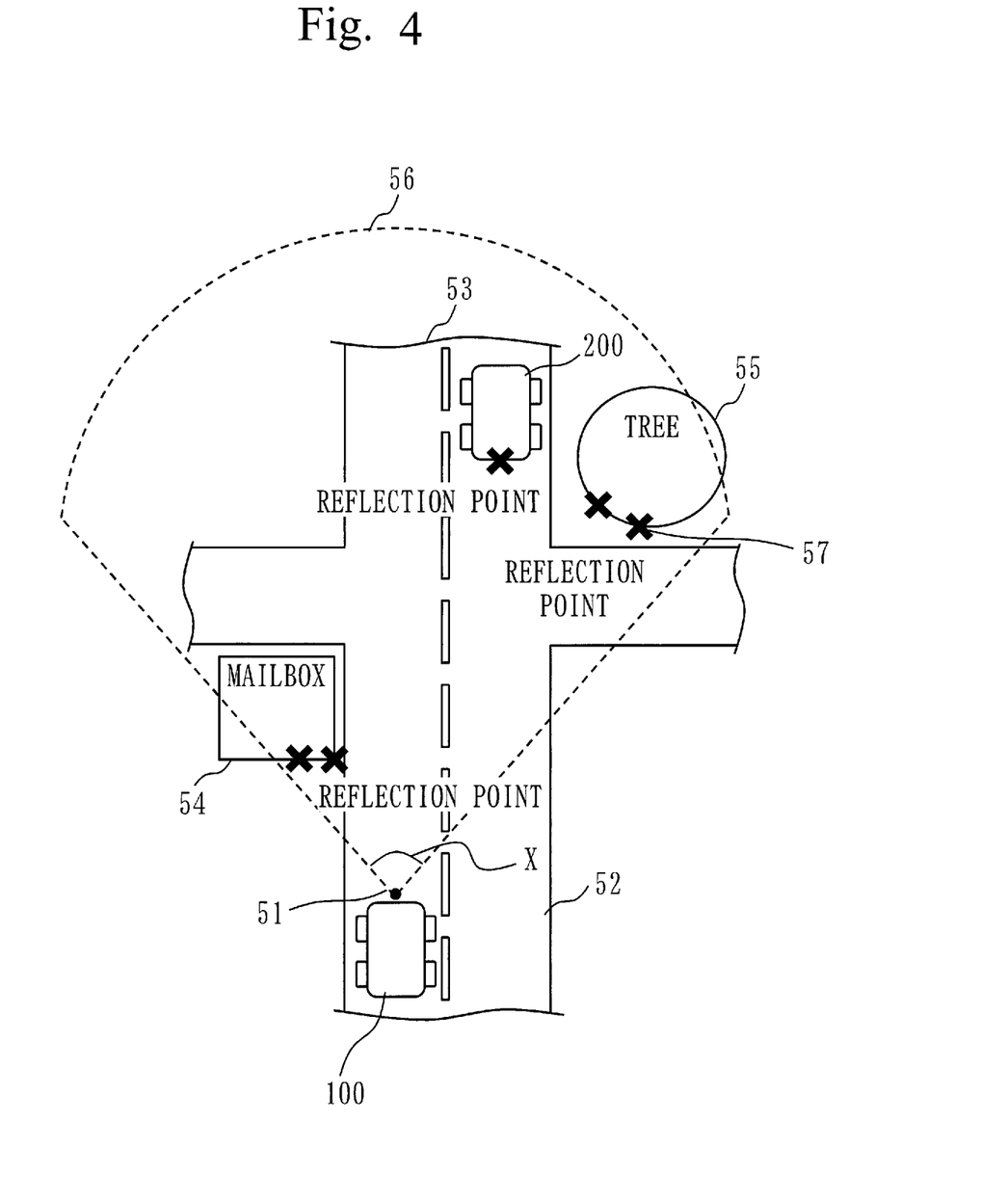
FIG. 4 is an explanatory diagram of sensing in a situation of FIG. 3 according to Embodiment 1.
Figure 5:
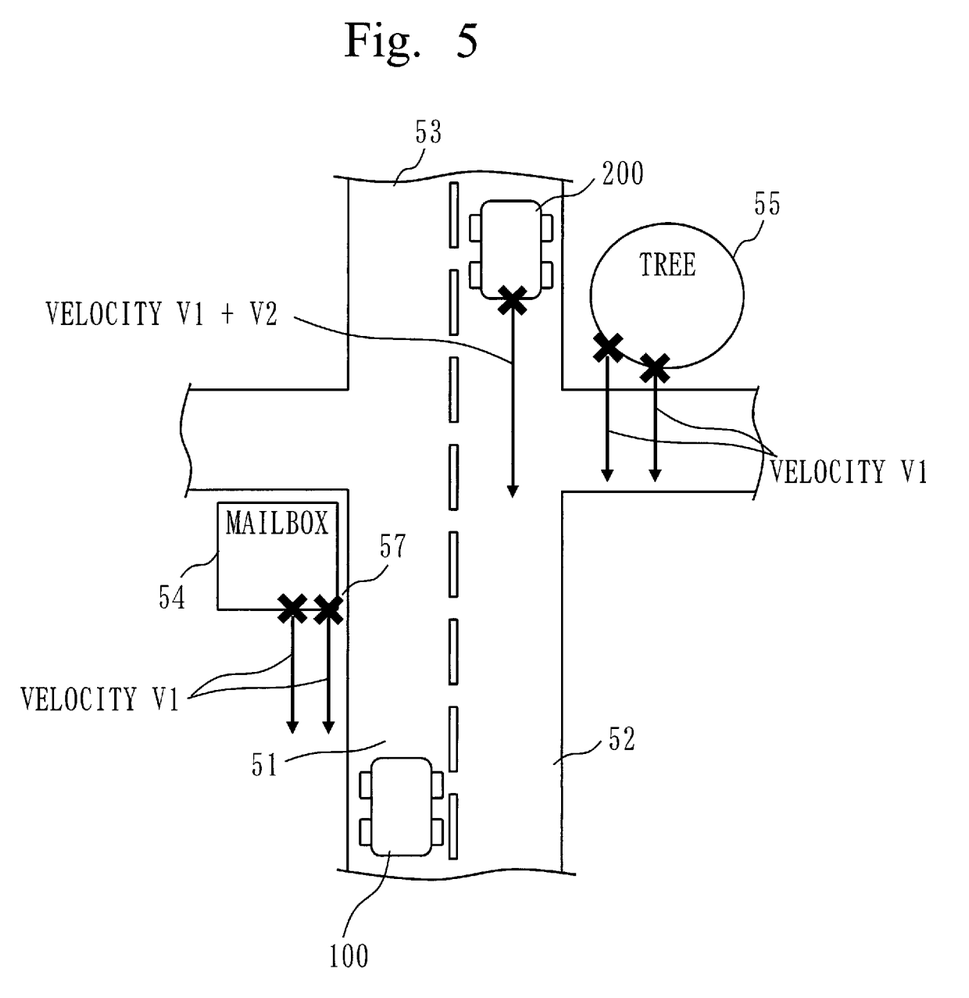
FIG. 5 is an explanatory diagram of detected data acquired in a situation of FIG. 4 according to Embodiment 1.

The detected data will be described in specific with reference to FIGS. 3 to 5.

Figure 3:
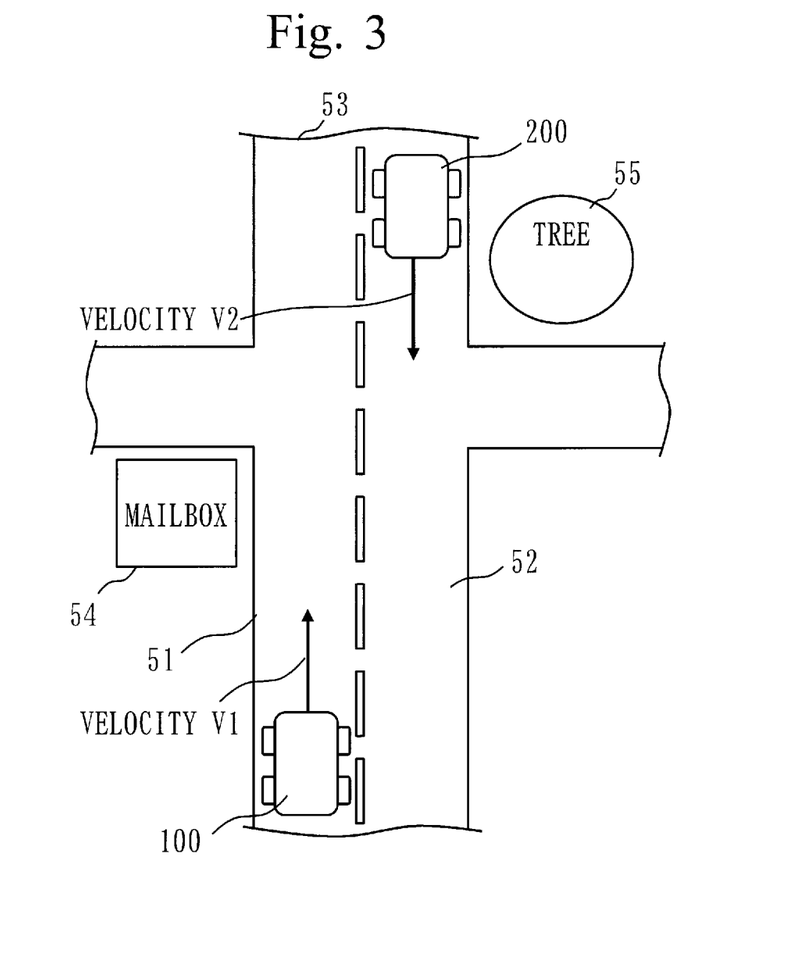
FIG. 3 is a diagram illustrating an example of a situation of a moving body 100 and surroundings according to Embodiment 1.

In FIG. 3, the moving body 100 is traveling at a velocity of v1, and the peripheral body 200 is traveling at a velocity of v2 in an opposite lane 52 of a lane 51 in which the moving body 100 is traveling. And, there exist a mailbox 54 and a tree 55 along outside a road 53. The sensor 31 is a type of a sensor, such as a millimeter wave radar or LIDAR, that detects whether or not there is an obstacle by emitting a radio wave or a laser toward a target object and having the radio wave or the laser reflected. Therefore, in a case of FIG. 3, as illustrated in FIG. 4, the sensor 31 emits the radio wave or the laser radially toward a range of an angle X in front of the moving body 100, and receives a reflected wave that is reflection of the radio wave or the laser by the detected object existing within a sensing range 56. In FIG. 4, the sensor 31 receives the reflected wave that is the reflection of the radio wave or the laser at a reflection point 57 indicated by "x". Because of a structure of the sensor 31, the reflection point 57 exists within a range visible from the moving body 100, and no reflection point 57 exists on back of the detected object that is invisible from the moving body 100.

The detected data acquisition unit 21 acquires the reflected wave that is the reflection at the reflection point 57, as the detected data. Based on time from emission of the radio wave or the laser until receipt of the reflected wave and a direction of emission of the radio wave or the laser, the detected data acquisition unit 21 is able to identify a relative position of the reflection point 57 to the moving body 100. Also, the detected data acquisition unit 21 is able to, by analyzing and differentiating a change in a position of the reflection point 57 in time series order, or by analyzing Doppler-frequency change of the reflected wave, identify a velocity and movement direction relative to one another between the moving body 100 and the detected object. In the case of FIG. 4, as illustrated in FIG. 5, since the mailbox 54 and the tree 55 do not move, reflection points 57 on the mailbox 54 and the tree 55 look as if they are moving toward the moving body 100 at a velocity of v1 that is same as that of the moving body 100. And, a reflection point 57 on the peripheral body 200, which is a moving object, looks as if it is moving toward the moving body 100 at a velocity of v1+v2, a combined velocity of the velocities of the moving body 100 and the peripheral body 200.

(Step S2 of FIG. 2: Peripheral Data Acquisition Process)

The peripheral data acquisition unit 22 acquires peripheral data detected by the peripheral body 200 existing on the peripheral of the moving body 100 via the communication interface 14. The peripheral data is data from which a position, movement direction, and movement velocity of the peripheral body 200 are identifiable as a detected content. Here, it is assumed that the peripheral data is data that indicates the position, movement direction, and movement velocity of the peripheral body 200.

The peripheral data will be described in specific with reference to FIG. 6.

Figure 6:
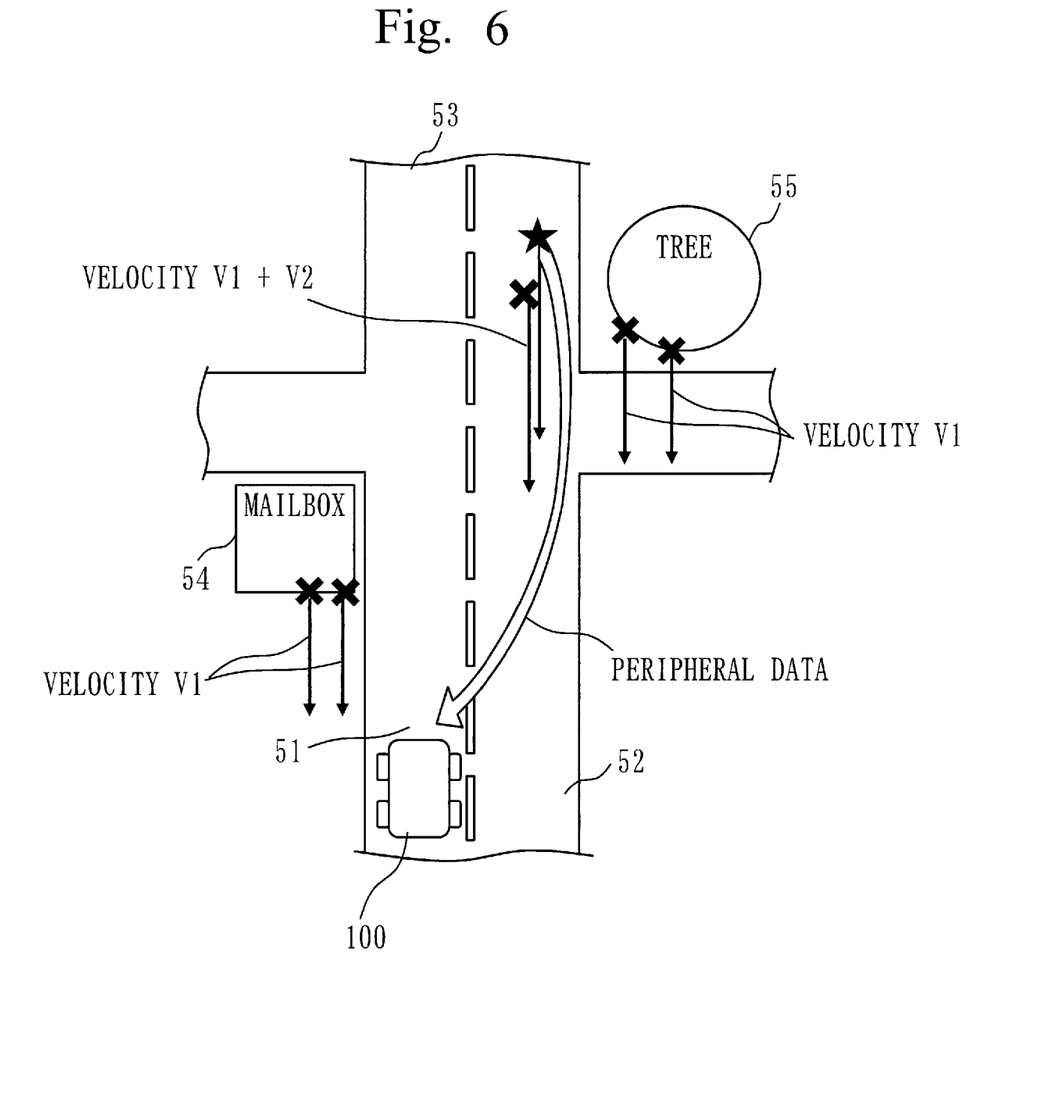
FIG. 6 is an explanatory diagram of peripheral data according to Embodiment 1.

FIG. 6 illustrates a case in which the peripheral data acquisition unit 22 acquires the peripheral data detected by the peripheral body 200 illustrated in FIG. 3.

The peripheral body 200 is able to identify, by a sensor mounted on the peripheral body 200, the position, movement direction, and movement velocity of the peripheral body 200. For example, the peripheral body 200 receives a positioning signal from a satellite, and thereby identifies the position. Also, the peripheral body 200, by analyzing and differentiating a change in the position in time series order, identifies the movement direction and the movement velocity. The peripheral body 200 transmits to the moving body 100, the peripheral data that indicates the identified position, movement direction, and movement velocity of the peripheral body 200, by radio communication.

The radio communication is, for example, 802.11p communication. However, the radio communication can be in any of other schemes, as long as communication of the peripheral data is allowed.

If the peripheral body 200 is not able to identify the movement direction and the movement velocity, the peripheral body 200 transmits to the moving body 100, peripheral data that indicates the position, by the radio communication. In this case, the peripheral data acquisition unit 22, by analyzing and differentiating a change in the position of the peripheral body 200 indicated by the transmitted peripheral data, in time series order, identifies the movement direction and the movement velocity.

(Step S3 of FIG. 2: Failure Determination Process)

The failure determination unit 23 determines whether or not the detected data acquired in step S1 includes detected data from which a detected content of which difference from the peripheral content is within a reference scope is identified, the peripheral content being identified from the peripheral data acquired in step S2. If includes, then the failure determination unit 23 determines that there is no failure in the sensor 31, and if does not include, then determines that there is a failure in the sensor 31.

The failure determination process according to Embodiment 1 (step S3 in FIG. 2) will be described with reference to FIG. 7.

The failure determination unit 23 executes the following processes of steps from S31 to S34 targeting each divided area 58 that is a divided area of the sensing range 56.

Figure 8:
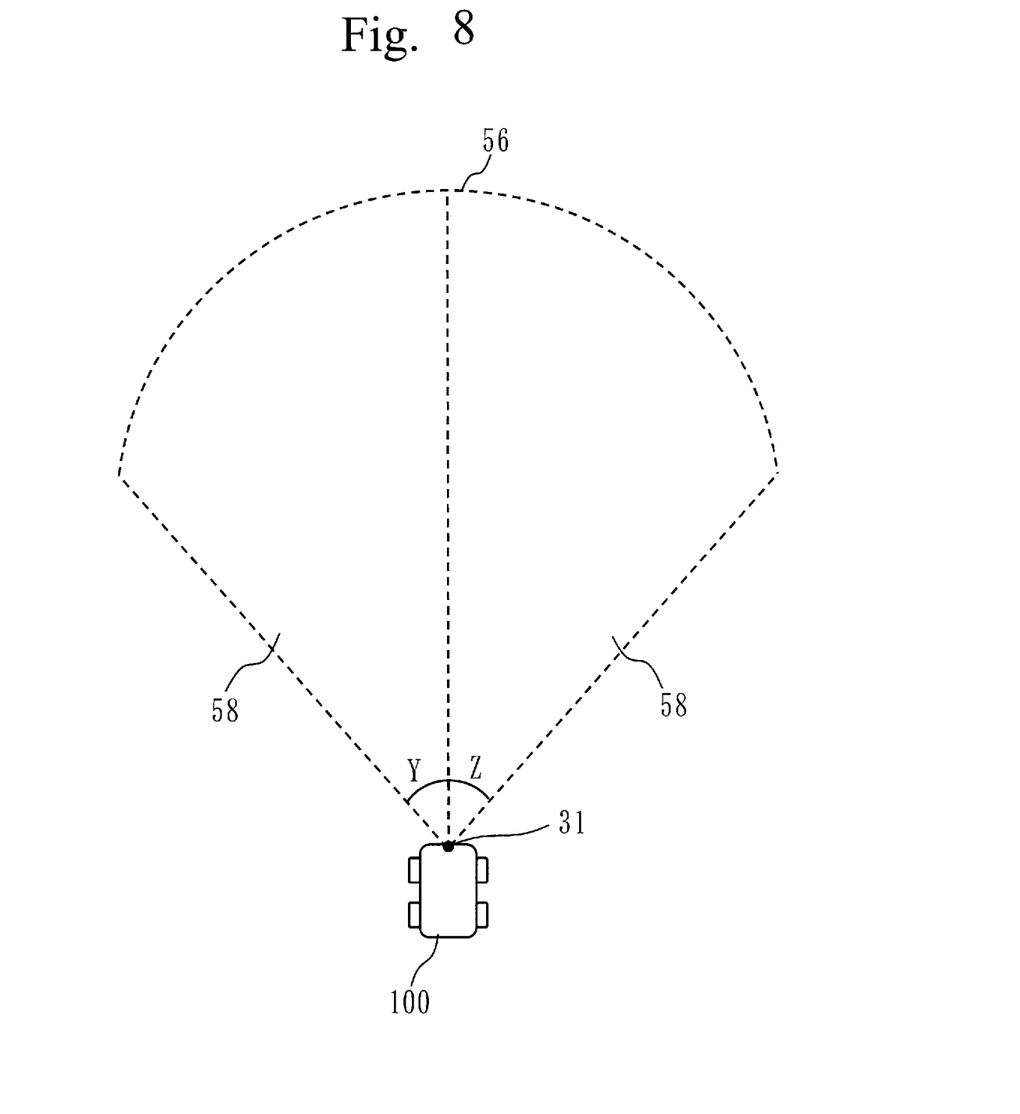
FIG. 8 is an explanatory diagram of a divided area 58 according to Embodiment 1.

As illustrated in FIG. 8, the divided area 58 is an area of the sensing range 56 that is divided into a sector centered at the sensor 31 with each arbitrary angle. In FIG. 8, the sensing range 56 is divided into two divided areas 58 of a divided area 58 with an angle of Y and a divided area 58 with an angle of Z. Note that the angles Y and Z may be same, or may be different.

Figure 7:
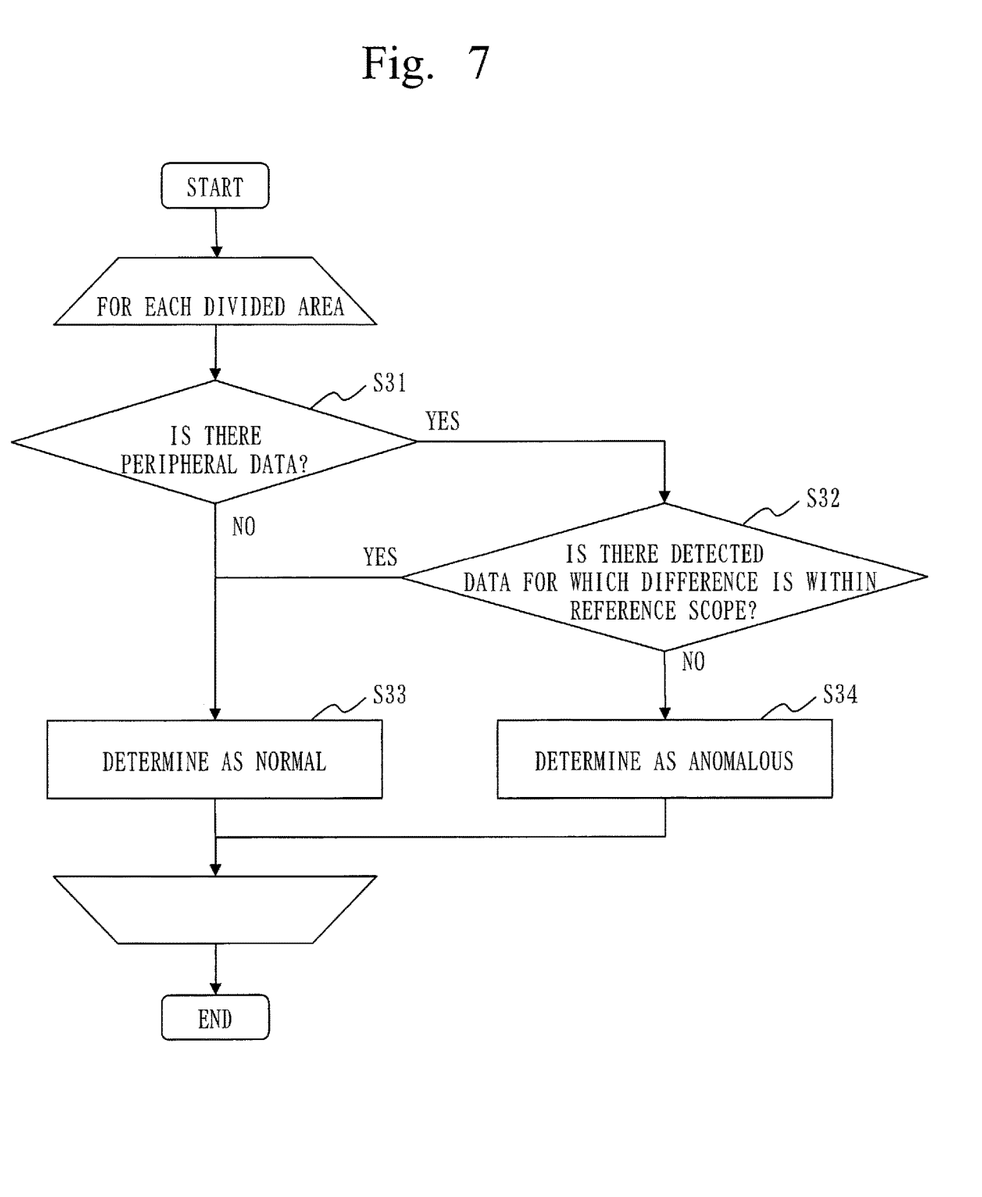
FIG. 7 is a flowchart of a failure determination process according to Embodiment 1.

(Step 31 of FIG. 7: Data Determination Process)

The failure determination unit 23 determines whether or not there is peripheral data a position identified from which is within a target divided area 58.

If there is, then the failure determination unit 23 proceeds with the process to step S32. On the other hand, if there is not, then the failure determination unit 23 proceeds with the process to step S33.

(Step 32 of FIG. 7: Object Determination Process)

The failure determination unit 23 determines whether or not the detected data includes detected data from which a detected content such that a total value is within a reference scope is identified, the total value being calculated by weighting and then adding up each of a difference in the positions, a difference in the movement directions, and a difference in the movement velocities, which are identified from the detected data and the peripheral data.

In specific, the failure determination unit 23, targeting each detected object, calculates TOTALdiff for the target detected object and the peripheral data, as illustrated in Formula 1.

$$LATdiff=|LATe-LATo|$$

$$LONdiff=|LONe-LONo|$$

$$Vdiff=|Ve-Vo|$$

$$DIRdiff=|DIRe-DIRo|$$

$$TOTALdiff=\alpha \times LATdiff+\beta \times LONdiff+\gamma \times Vdiff+\delta \times DIRdiff \qquad <\text{Formula 1}>$$

Here, it is assumed that positions of a detected object and the peripheral body 200 are indicated by latitude and longitude. LATe is latitude of the detected object, and LATo is latitude of the peripheral body 200. LONe is longitude of the detected object, and LONo is longitude of the peripheral body 200. Ve is a movement velocity of the detected object, and Vo is a movement velocity of the peripheral body 200. DIRe is a movement direction of the detected object, and DIRo is a movement direction of the peripheral body 200. $\alpha$, $\beta$, $\gamma$, and $\delta$ are weighting coefficients.

The failure determination unit 23 determines whether or not there is a detected object for which the calculated TOTALdiff is within a reference scope. In other words, the failure determination unit 23 determines whether or not there is a detected object that holds TOTALdiff≤reference scope TOTALth.

If there is, then the failure determination unit 23 proceeds with the process to step S33. On the other hand, if there is not, then the failure determination unit 23 proceeds with the process to step S34.

(S33 of FIG. 7: Normality Determination Process)

The failure determination unit 23 determines that operation of the sensor 31 is normal for the target divided area 58.

Figure 9:
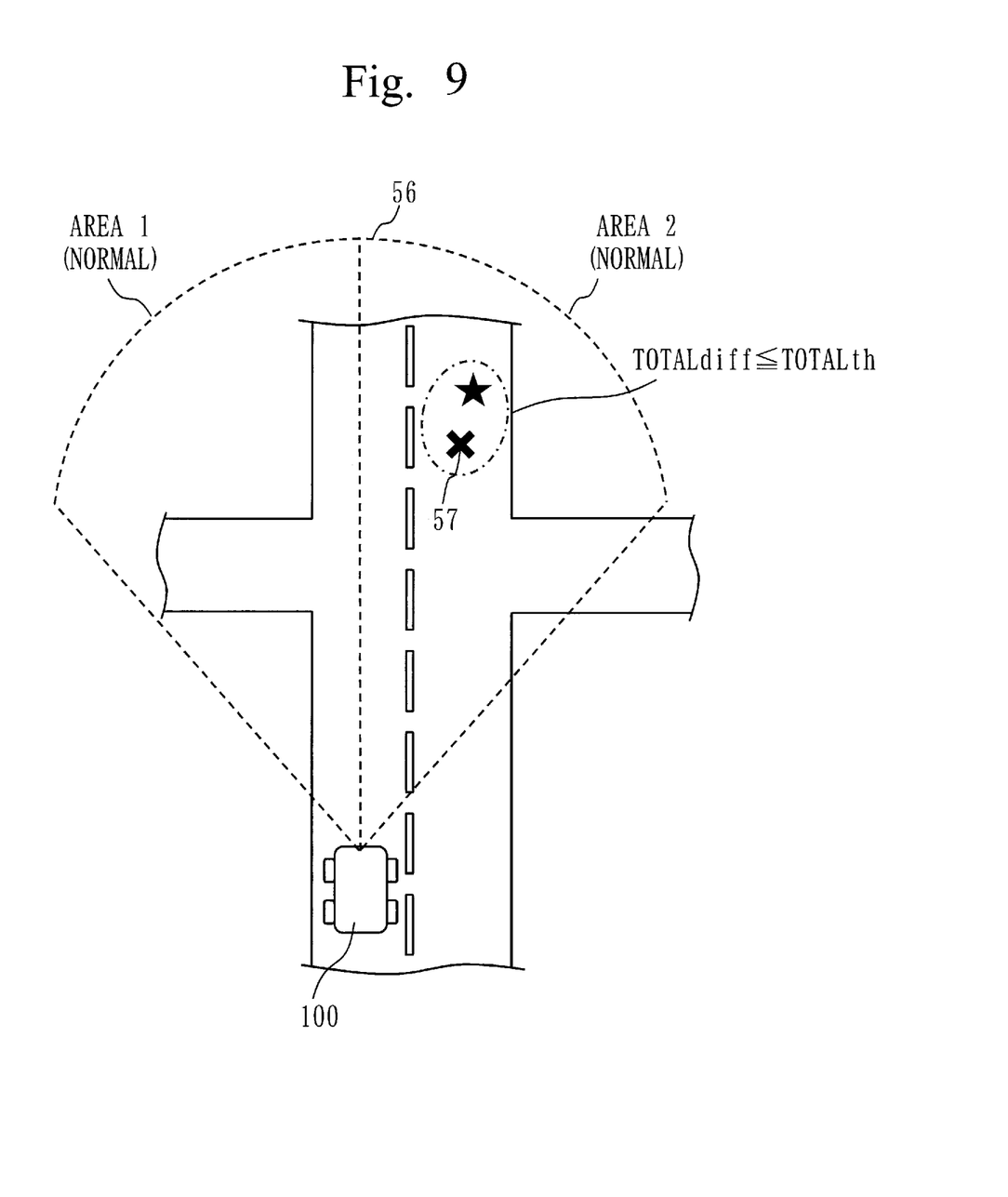
FIG. 9 is a diagram illustrating an example of a case in which it is determined that operation of a sensor 31 is normal according to Embodiment 1.

In other words, for the divided area 58 for which it has been determined that there is no peripheral data the position identified from which in step S31 is within the target divided area 58, such as area 1 in FIG. 9, it is determined that the operation of the sensor 31 is normal. Also for the divided area 58 for which it has been determined in step S32 that there is the detected object that holds TOTALdiff≤reference scope TOTALth, such as area 2 in FIG. 9, it is determined that the operation of the sensor 31 is normal.

(Step S34 of FIG. 7: Anomaly Determination Process)

The failure determination unit 23 determines that the operation of the sensor 31 is anomalous for the target divided area 58.

Figure 10:
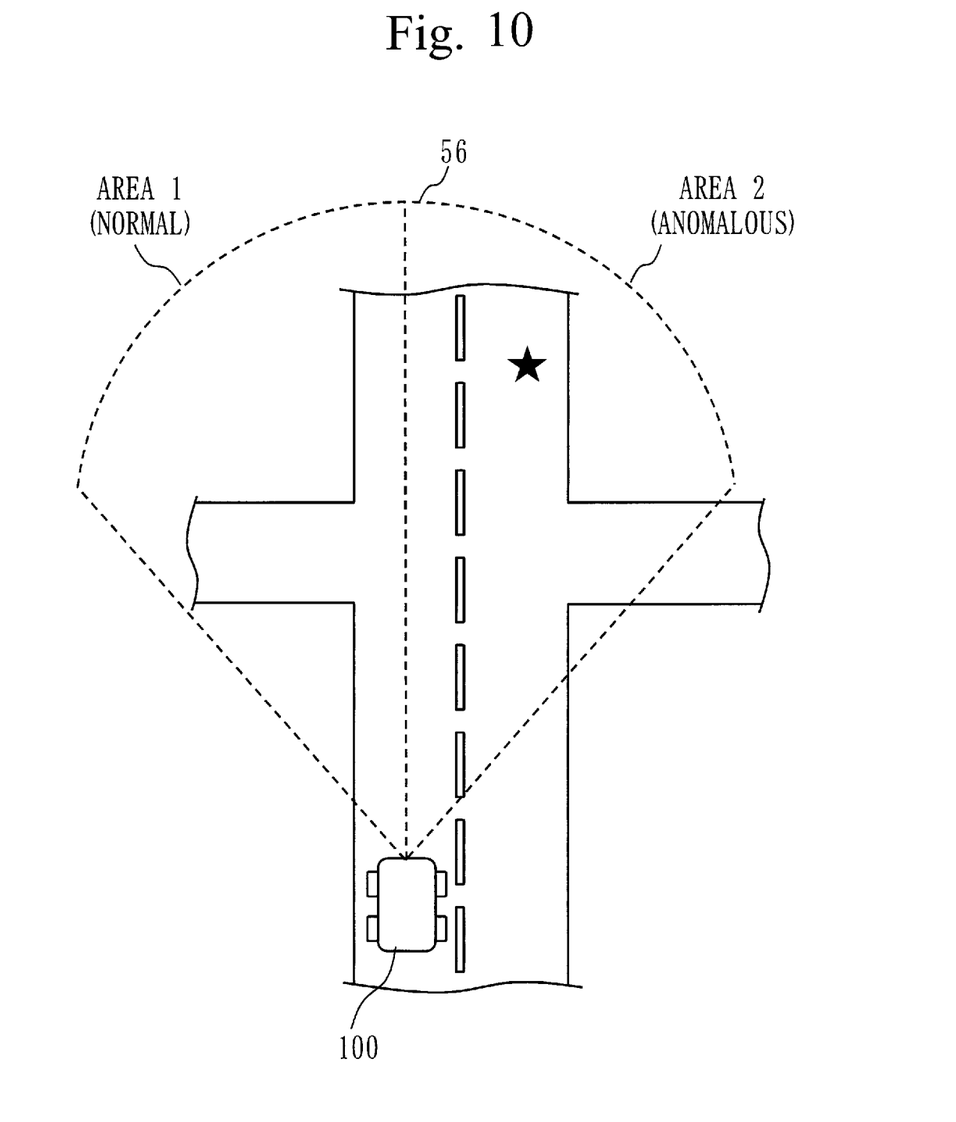
FIG. 10 is a diagram illustrating an example of a case in which it is determined that the operation of the sensor 31 is anomalous according to Embodiment 1.

In other words, for the divided area 58 for which it has been determined in step S32 that there is no detected object that holds TOTALdiff≤reference scope TOTALth, such as area 2 in FIG. 10, it is determined that the operation of the sensor 31 is anomalous.

(Step 4 of FIG. 2: Notification Process)

The notification unit 24 outputs a result determined in step S33 or S34 to the display device 33 via the communication interface 14, and have the result be displayed. For example, if it has been determined that there is the anomaly in step S34, the notification unit 24 displays the divided area 58 or the like for which it has been determined that there is the anomaly, with graphics or text. In this way, a person on the moving body 100, such as a driver, is notified of a state of the sensor 31.

When the sensor 31 is used for a driving support function such as an emergency automatic braking function, the notification unit 24 may also notify a device that realizes the function of presence or absence of the anomaly of the sensor 31. In this way, it becomes possible to take measures, such as stopping all or a part of the driving support function, if there is the anomaly in the sensor 31.

\*\*\*Advantageous Effect of Embodiment 1\*\*\*

As described above, the failure detection apparatus 10 according to Embodiment 1 determines whether or not detected data for a past reference period includes detected data that identifies a detected content of which difference from a peripheral content identified from peripheral data detected by the peripheral body 200 is within a reference scope. In this way, the failure detection apparatus 10 according to Embodiment 1 determines whether or not there is a failure in a sensor.

Therefore, it is possible to detect an anomaly of the sensor without generating a model in advance.

\*\*\*Other Configurations\*\*\*

<Modification 1>

In Embodiment 1, for the divided area 58 for which there is no peripheral data a position identified from which is within the target divided area 58, it is determined that the operation of the sensor 31 is normal.

For the divided area 58 for which there is no peripheral data the position identified from which is within the target divided area 58, it may be determined whether or not the operation of the sensor 31 is normal based on whether or not detected data for a past reference period includes detected data that indicates a characteristic of a detected object that is indicated by normal data to be outputted if the sensor 31 is normal. As described above, an object that does not move, such as the mailbox 54 and the tree 55, looks as if it is moving toward the moving body 100 at a velocity of v1 that is same as that of the moving body 100. Thus, for the divided area 58 for which there is no peripheral data the position identified from which is within the target divided area 58, the failure determination unit 23 may determine whether or not the operation of the sensor 31 is normal based on whether or not the detected data for the past reference period includes detected data that indicates a movement direction opposite to that of the moving body 100 and also a movement velocity that is same as that of the moving body 100.

<Modification 2>

In Embodiment 1, each of the functional components is realized by software. However, as Modification 2, each of the functional components may be realized by hardware. Regarding Modification 2, difference from Embodiment 1 will be described.

Figure 11:
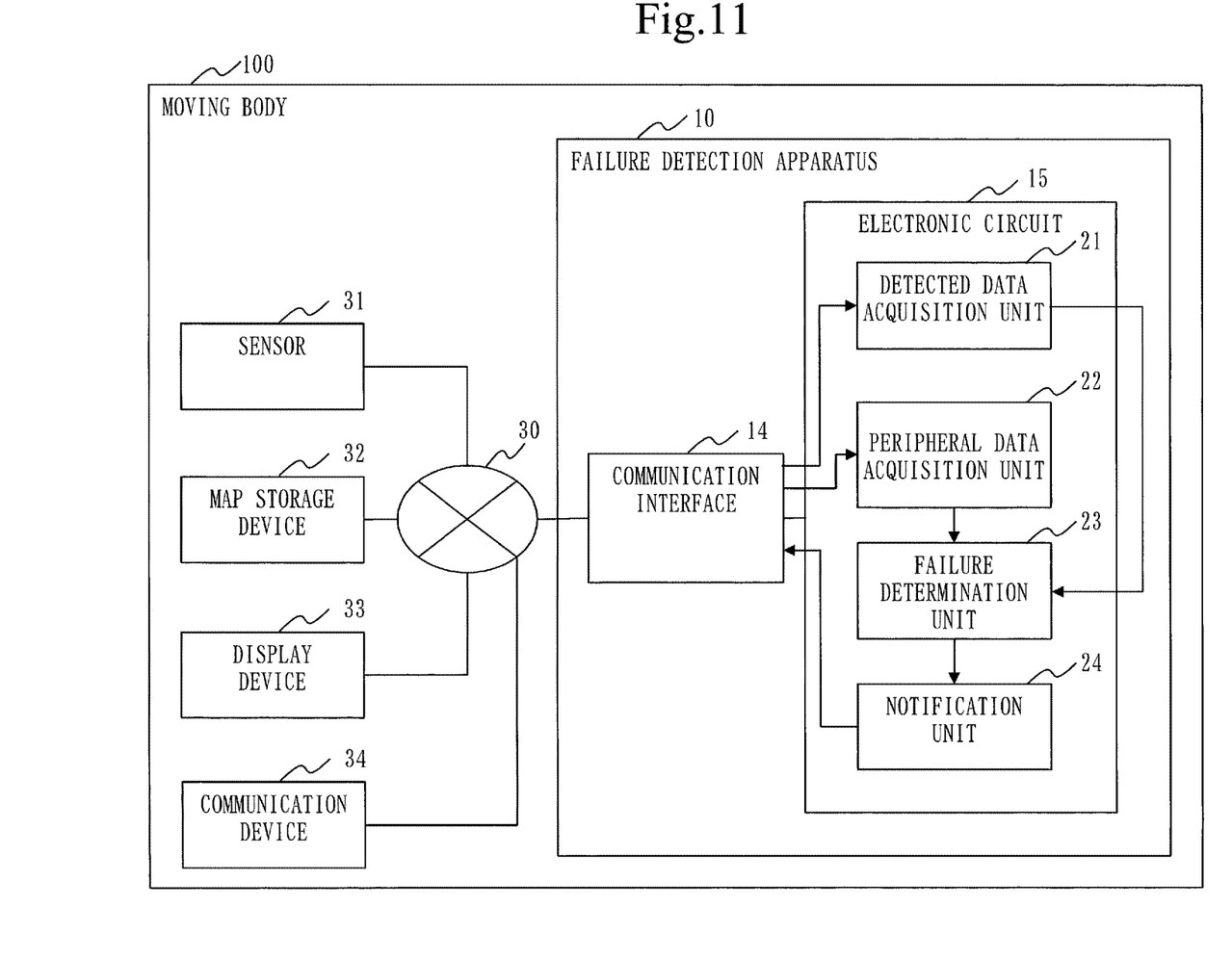
FIG. 11 is a configuration diagram of a failure detection apparatus 10 according to Modification 2.

A configuration of a failure detection apparatus 10 according to Modification 2 will be described with reference to FIG. 11.

When each of the functional components is realized by the hardware, the failure detection apparatus 10 has an electronic circuit 15 in place of the processor 11, the memory 12, and the storage 13. The electronic circuit 15 is a dedicated electronic circuit that realizes functions of each of the functional components, the memory 12, and the storage 13.

The electronic circuit 15 is assumed to be a single circuit, a composite circuit, a programmed processor, a parallel programmed processor, a logic IC, a gate array (GA), an application-specific integrated circuit (ASIC), or a field-programmable gate array (FPGA).

Each of the functional components may be realized by one electronic circuit 15, or each of the functional components may be realized by being distributed among a plurality of electronic circuits 15.

<Modification 3>

As Modification 3, each of the functional components may be realized partly by hardware, and each of the other functional components may be realized by software.

The processor 11, the memory 12, the storage 13, and the electronic circuit 15 are referred to collectively as processing circuitry. In other words, the functions of each of the functional components are realized by the processing circuitry.

Embodiment 2

Embodiment 2 differs from Embodiment 1 in that Embodiment 2 carries out determination by considering a lag between output times of detected data and peripheral data. In Embodiment 2, description on the difference will be given, but description on same points will be omitted.

\*\*\*Description of Operation\*\*\*

Operation of a failure detection apparatus 10 according to Embodiment 2 will be described with reference to FIGS. 7 and 12.

The operation of the failure detection apparatus 10 according to Embodiment 2 corresponds to a failure detection method according to Embodiment 2. And, the operation of the failure detection apparatus 10 according to Embodiment 2 corresponds to a failure detection program according to Embodiment 2.

A failure determination process (step S3 of FIG. 2) according to Embodiment 2 will be described with reference to FIG. 7.

Processes of steps S31, S33, and S34 are same as those of Embodiment 1.

Note that, in Embodiment 2, it is assumed that detected data indicates time of output by the sensor 31 mounted on the mobbing body 100. It is also assumed that peripheral data is data that is acquired from sensor data outputted by a sensor mounted on the peripheral body 200, and indicates time of output by the sensor mounted on the peripheral data 200. Here, it is assumed that the time at the moving body 100 and the time at the peripheral body 200 are synchronized via a positioning signal or the like.

(Step S32 of FIG. 7: Object Determination Process)

The failure determination unit 23 calculates a position of the peripheral body 200 at the time that the detected data indicates, based on a lag between the time that the detected data indicates and the time that the peripheral data indicates, and a movement direction and a movement velocity identified from the peripheral data. Then, the failure determination unit 23 treats the calculated position as a position that is identified from the peripheral data.

After that, the failure determination unit 23 determines, in a same way as that of Embodiment 1, whether or not the detected data includes detected data from which a detected content such that a total value is within a reference scope is identified, the total value being calculated by weighting and then adding up each of a difference in the positions, a difference in the movement directions, and a difference in the movement velocities, which are identified from the detected data and the peripheral data.

In specific, the failure determination unit 23, targeting each detected object, calculates a position of the peripheral body 200 at time that detected data regarding the target detected object indicates, as illustrated in Formula 2.

$$TIMEdiff = TIMEo - TIMEe$$

$$LATo' = LATo + TIMEdiff \times Volat$$

$$LONo' = LONo + TIMEdiff \times Volon \qquad <Formula\ 2>$$

Here, TIMEe is time that detected data indicates, and TIMEo is time that peripheral data indicates. Volat is a velocity of a latitudinal direction of the peripheral body 200, and Volon is a velocity of a longitudinal direction of the peripheral body 200. LATo' is latitude of the peripheral body 200 at the time that the detected data indicates, and LONo' is longitude of the peripheral body 200 at the time that the detected data indicates.

Figure 12:
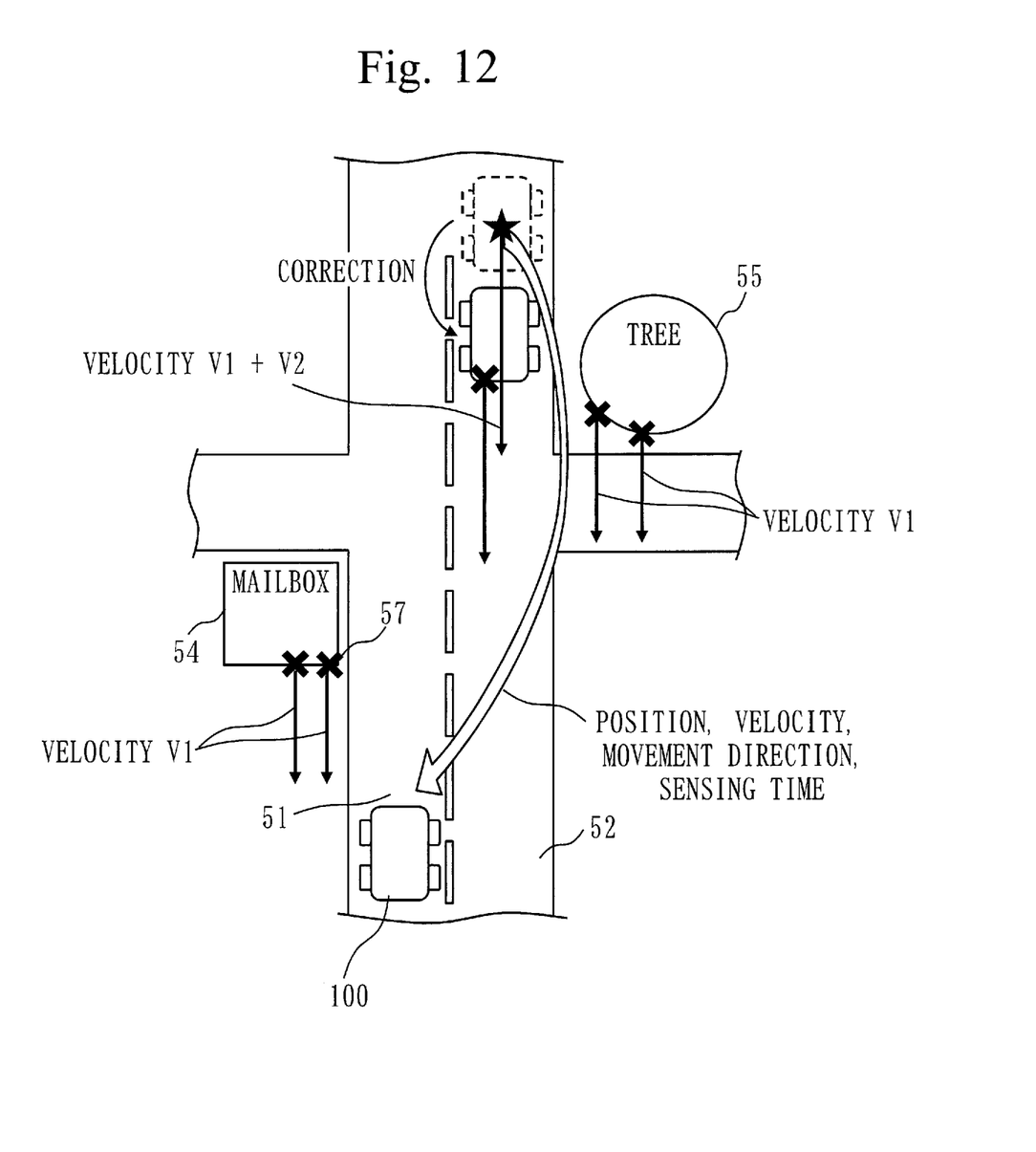
FIG. 12 is an explanatory diagram of correction of a position according to Embodiment 2.

In this way, as illustrated in FIG. 12, it is possible to correct a difference between the position of the peripheral body 200 calculated from the detected data and the position of the peripheral body 200 calculated from the peripheral data, due to a lag between the time of output of the detected data and the time of output of the peripheral data.

Then, the failure determination unit 23, using the position of the peripheral body 200 at the time that the detected data indicates, calculates TOTALdiff by Formula 1, and determines whether or not there is a detected object for which TOTALdiff is within a reference scope.

\*\*\*Advantageous Effect of Embodiment 2\*\*\*

As described above, the failure detection apparatus 10 according to Embodiment 2, by considering a lag between time that detected data indicates and time that peripheral data indicates, corrects a position identified from the peripheral data. In this way, for example, even if it takes time to acquire the peripheral data due to occurrence of communication delay, it is possible to determine whether or not there is a failure in the sensor 31 with accuracy.

REFERENCE SIGNS LIST

10: failure detection apparatus, 11: processor, 12: memory, 13: storage, 14: communication interface, 15: electronic circuit, 21: detected data acquisition unit, 22: peripheral data acquisition unit, 23: failure determination unit, 24: notification unit, 31: sensor, 32: map storage device, 33: display device, 34: communication device, 51: lane, 52: opposite lane, 53: road, 54: mailbox, 55: tree, 56: sensing range, 57: reflection point, 58: divided area

The invention claimed is:

1. A failure detection apparatus comprising:
processing circuitry to:
acquire detected data that is sensor data outputted during a past reference period by a sensor mounted on a moving body, the sensor data being data from which a position, movement direction, and movement velocity of an object existing on peripheral of the moving body to the moving body are identifiable as detected content,
acquire peripheral data detected by the peripheral body existing on the peripheral of the moving body, the peripheral data being data from which the position, movement direction, and movement velocity of the peripheral body are identifiable as peripheral content, and
determine whether or not there is a failure in the sensor based on whether or not the detected data acquired includes detected data from which a detected content such that a total value is within a reference scope is identified, the total value being calculated by weighting and then adding up each of a difference in the positions, a difference in the movement directions, and a difference in the movement velocities, which are identified from the detected data and the peripheral data.

2. The failure detection apparatus according to claim 1, wherein the detected data indicates time of output by the sensor mounted on the moving body;
wherein the peripheral data is data that is acquired from sensor data outputted by a sensor mounted on the peripheral body, and indicates time of output by the sensor mounted on the peripheral body; and
wherein the processing circuitry calculates a position of the peripheral body at the time that the detected data indicates, based on a lag between the time that the detected data indicates and the time that the peripheral data indicates, and the movement direction and the movement velocity identified from the peripheral data, and then treats the calculated position as a position that is identified from the peripheral data.

3. The failure detection apparatus according to claim 1, wherein the processing circuitry determines whether or not there is the failure in the sensor for each divided area obtained by dividing a sensing range of the sensor.

4. The failure detection apparatus according to claim 2, wherein the processing circuitry determines whether or not there is the failure in the sensor for each divided area obtained by dividing a sensing range of the sensor.

5. A failure detection method comprising:
acquiring detected data that is sensor data outputted during a past reference period by a sensor mounted on a moving body, the sensor data being data from which a position, movement direction, and movement velocity of an object existing on peripheral of the moving body to the moving body are identifiable as detected content;
acquiring peripheral data detected by the peripheral body existing on the peripheral of the moving body, the peripheral data being data from which the position, movement direction, and movement velocity of the peripheral body are identifiable as peripheral content; and
determining whether or not there is a failure in the sensor based on whether or not the detected data acquired includes detected data from which a detected content such that a total value is within a reference scope is identified, the total value being calculated by weighting and then adding up each of a difference in the positions, a difference in the movement directions, and a difference in the movement velocities, which are identified from the detected data and the peripheral data.

6. A non-transitory computer readable medium storing a failure detection program that causes a computer to execute:
- a detected data acquisition process of acquiring detected data that is sensor data outputted during a past reference period by a sensor mounted on a moving body the sensor data being data from which a position, movement direction, and movement velocity of an object existing on peripheral of the moving body to the moving body are identifiable as detected content;
- a peripheral data acquisition process of acquiring peripheral data detected by the peripheral body existing on the peripheral of the moving body, the peripheral data being data from which the position, movement direction, and movement velocity of the peripheral body are identifiable as peripheral content; and
- a failure determination process of determining whether or not there is a failure in the sensor based on whether or not the detected data acquired by the detected data acquisition process includes detected data from which a detected content such that a total value is within a reference scope is identified, the total value being calculated by weighting and then adding up each of a difference in the positions, a difference in the movement directions, and a difference in the movement velocities, which are identified from the detected data and the peripheral data.

\* \* \* \* \*